United States Patent [19]

Kness et al.

[11] 4,297,805

[45] Nov. 3, 1981

[54] ANIMAL TRAP

[75] Inventors: Lester E. Kness, Granger; Marvin E. Kness; Arnold A. Kness, both of Albia, all of Iowa

[73] Assignee: Kness Manufacturing Co., Inc., Albia, Iowa

[21] Appl. No.: 149,188

[22] Filed: May 12, 1980

[51] Int. Cl.³ ............................................. A01M 23/30
[52] U.S. Cl. .................................................... 43/83.5
[58] Field of Search ....................... 43/81, 82, 83, 83.5

[56] References Cited

U.S. PATENT DOCUMENTS

| | | | |
|---|---|---|---|
| 1,248,944 | 12/1917 | Stilson | 43/83.5 |
| 1,250,022 | 12/1917 | Ruby | 43/83.5 |
| 2,247,652 | 7/1941 | Dougherty | 43/83.5 |
| 2,263,560 | 11/1941 | Barrows | 43/83.5 |
| 2,544,475 | 3/1951 | Uttz | 43/81 |
| 2,637,932 | 5/1953 | Stilson | 43/83.5 |

Primary Examiner—James L. Jones, Jr.
Attorney, Agent, or Firm—Zarley, McKee, Thomte, Voorhees & Sease

[57] ABSTRACT

An animal trap comprises a base frame having an upper surface, a jaw member pivotally mounted on the base for pivotal movement from a cocked position to a sprung position, the jaw member having at least one horizontal bar extending transversely of the base. Spring apparatus yieldably urge the jaw member to the sprung position. A catch member is pivotally mounted on the frame also and includes a catch pawl for retentively engaging the bar of the jaw member to hold the bar in its cocked position. The catch member is pivotal away from retentive engagement with the bar to release the jaw member so that it can return to its original position. A trip member is also pivotally mounted on the base, and is engageable with the catch member to hold the catch member against the bar when the bar is in its locked position. The trip member is movable to release the catch member which in turn releases the bar and permits the jaw member to pivot to its sprung position. A reset member is provided on the upper surface of the base and is adapted to reset all of the various components automatically to the proper position when the jaw member is manually moved from its sprung position to its cocked position.

9 Claims, 7 Drawing Figures

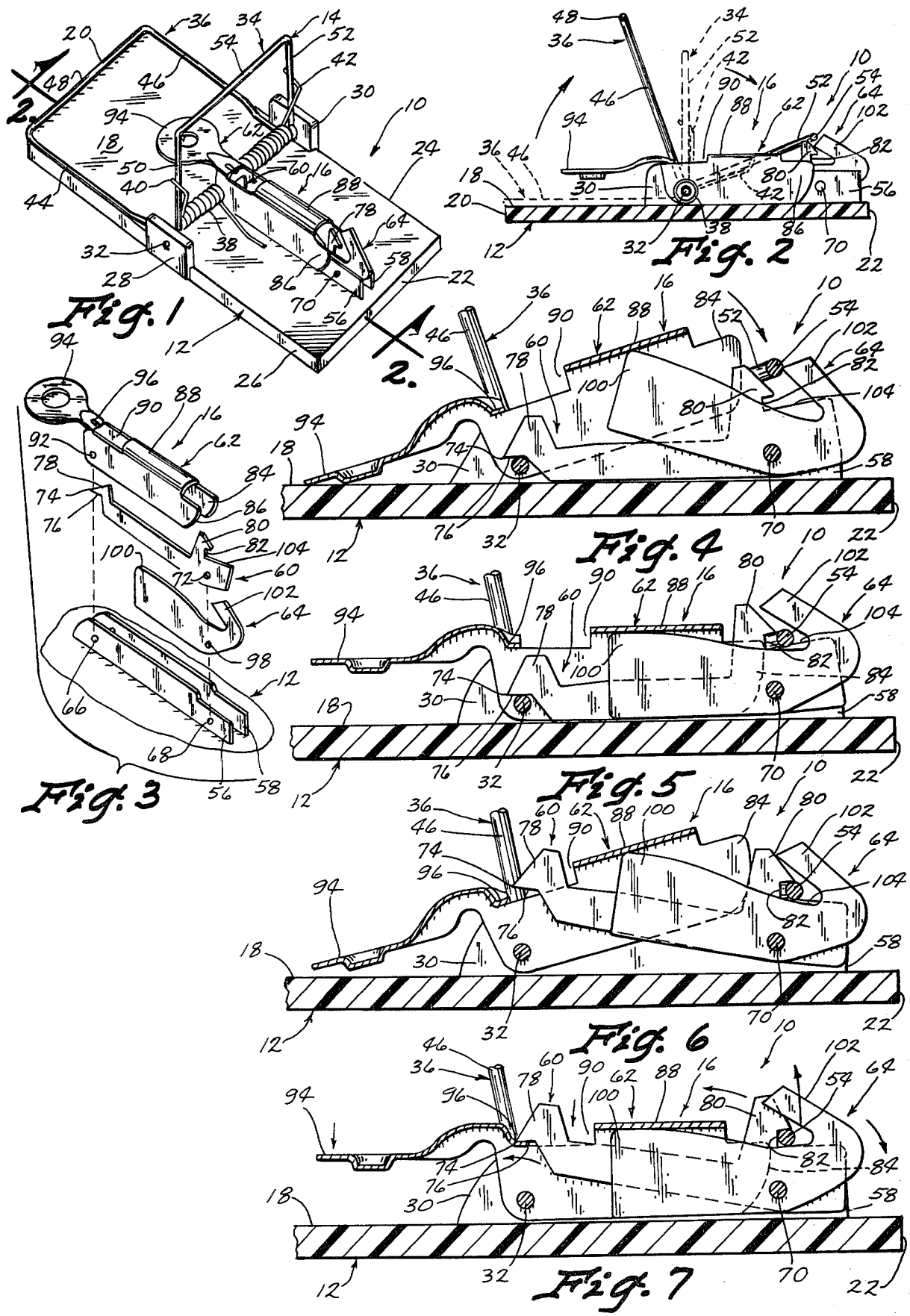

4,297,805

ANIMAL TRAP

BACKGROUND OF THE INVENTION

This invention relates to animal traps and to a method for using the same.

Numerous types of mouse and rat traps are widely used to catch and remove these pests. The conventional mouse trap includes a bar which is spring mounted and which pivots from a cocked position to a sprung position in response to the trap being tripped by the animal. There are several disadvantages with this type of conventional trap.

The setting of these conventional traps is often hazardous to the hands and fingers, since it is necessary to place the hands and fingers in the path of the spring mounted bar during setting. Occasionally the catch mechanism of these prior traps is unreliable and releases before the person setting the trap can remove his fingers or hands from the hazardous area in the path of the spring mounted bar. The catches are sometimes too sensitive to be usable and other times they are too insensitive to respond to the mouse or rat taking the bait. Furthermore, the catches used on these devices are not durable and sometimes the trap must be discarded after one use.

Another problem is encountered in the release of the trapped animal from the trap. This is a difficult and messy task inasmuch as it is necessary to grasp the bar which has killed the animal and move the bar to release the animal from the trap. This entails touching the bar in the vicinity of the animal and sometimes even requires touching the animal itself.

Therefore, a primary object of the present invention is the provision of an improved animal trap and method for using same.

A further object of the present invention is the provision of an animal trap which can be set without placing the hands and fingers in a position of jeopardy with respect to the spring mounted bar of the trap.

A further object of the present invention is the provision of an improved animal trap which utilizes a catch mechanism which automatically sets when the bar is moved to its cocked position.

A further object of the present invention is the provision of an improved animal trap having a catch mechanism which is reliable in grasping and holding the bar in its cocked position without accidental release.

A further object of the present invention is the provision of a mouse trip having a trip mechanism that is very sensitive to the animal's touch and which will spring the trap in response to a very light touch by the animal.

A further object of the present invention is the provision of a trap which can be emptied without touching the dead animal.

A further object of the present invention is the provision of a trap having an automatic reset mechanism which is engaged by the bar as the bar moves to its cocked position and which responds to this engagement to place the remaining parts of the trap in a position whereby they will receive and hold the bar in its cocked position.

A further object of the present invention is the provision of a trap which is durable and which can be reused numerous times.

A further object of the present invention is the provision of a device and method for using same which is simple and economical.

SUMMARY OF THE INVENTION

The present invention comprises a trap which is similar in construction to the standard mouse trap construction, but which includes numerous features which provide significant improvement thereover. One feature involves the use of two U-shaped members in the place of a single U-shaped member found in conventional traps. One of the U-shaped members is utilized for the conventional purpose of springing towards the animal and killing it on impact. The other U-shaped member is utilized for grasping by the operator and for pivoting the trap to its cocked position during setting.

Another feature involves the use of a unique trip-catch mechanism which releaseably holds the U-shaped members in a cocked position, and which reliably trips and releases the U-shaped bar in response to the animal touching the bait. The trip-catch mechanism permits setting of the trap without placing one's hands in the path of the spring mounted U-shaped member. Furthermore, the trap can be emptied without the necessity of touching the dead animal or the bar which struck it.

BRIEF DESCRIPTION OF THE DRAWINGS

FIG. 1 is a perspective view of the present invention.

FIG. 2 is a sectional view taken along line 2—2 of FIG. 1.

FIG. 3 is an exploded perspective view of the catch and trip mechanism of the present invention.

FIGS. 4 through 7 are sectional views showing the catch and trip mechanism in its various positions.

DETAILED DESCRIPTION OF THE INVENTION

Referring to the drawings, the numeral 10 generally designates the animal trap of the present invention. Trap 10 comprises a base platform 12, a pivoting jaw frame 14, and a trip catch mechanism 16. Platform 12 comprises an upper surface 18, a forward end 20, a rearward end 22, and opposite sides 24, 26.

Extending upwardly from the approximate longitudinal center of side edges 24, 26 are a pair of ears 28, 30. Journaled within ears 28, 30 and extending therebetween is an axle 32.

Jaw frame 14 is formed from a continuous wire formed in the shape of a rectangle. The rectangle is folded into two U-shaped members 34, 36 which are at approximately right angles with respect to one another. The apex between U-shaped members 34, 36 surrounds axle 32 so that axle 32 provides a pivot point for jaw member 14. A spring member 38 surrounds axle 32, and includes spring ends 40, 42 which engage jaw frame 14 in such a manner to clamp jaw frame 14 to axle 32 and also to bias jaw frame 14 to the position shown in FIG. 1.

U-shaped frame 36 includes a pair of opposite legs 44, 46 joined by a cross-bar 48. Similarly, U-shaped frame 34 includes a pair of opposite legs 50, 52 joined by cross bar 54.

Trip catch mechanism 16 comprises a pair of spaced apart vertical flanges 56, 58 fixed to the upper surface of base platform 12, a catch member 60, a trip member 62, and a reset member 64. Flanges 56, 58 include a forward axle hole 66 and a rearward axle hole 68. Forward axle hole 66 receives axle 32 and rearward axle hole 68 receives a second axle 70.

Catch member 60 includes a hole 72 for receiving pin 70 so as to pivotally mount catch member 60 about axle 70. It should be noted that hole 72 is located way from the center of gravity of catch member 60 so that gravity causes catch member 60 to tend to pivot in a counterclockwise direction. At the forward end of catch member 60 is a trip pawl 74 having a downwardly presented flat surface 76 and an upwardly presented cam surface 78, which is beveled slightly.

A catch pawl 80 having a notch 82 is located adjacent and above hole 72 so as to move in an arcuate path above hole 72 during rotation of catch member 60 about the axis provided by hole 72.

Trip member 62 comprises a yoke-like frame having two downwardly presented legs 84, 86 joined at their upper ends by a web 88. A rectangular hole 90 is formed in web 88 adjacent the forward end thereof and is adapted to receive trip pawl 74 therein. An axle receiving hole 92 is formed in legs 84, 86 and is adapted to receive axle 32 which extends through flanges 56, 58 and also through legs 84, 86 so as to pivotally mount trip member 62 for pivotal movement about the axis provided by axle 32. A bait receiving tongue 94 is provided at the extreme forward end of trip member 62. A pawl receiving notch 96 is formed in the forward upper margin of hole 90 and is adapted to receive flat surface 76 of pawl 74.

Reset member 64 includes a hole 98 therein for receiving pin 70 so that reset member 64 pivots about the axis provided by pin 70. Reset member 64 includes a foot 100 which protrudes between legs 84, 86 of trip member 62 and which is positioned below web 88 of trip member 62. At the other end of reset member 64 is a reset finger 102. Finger 102 is located above axis 70 and is beveled slightly so as to respond to downward pressure against finger 102 to turn reset member 64 in a clockwise direction about axis 70.

The operation of the device is as follows: When the trap is in the position shown in FIG. 1, jaw frame 14 is held by spring 38 with U-shaped member 36 in facing engagement with the upper surface of base platform 12. The operator grasps upstanding U-shaped frame 34 and pivots this frame rearwardly in a clockwise direction as shown in FIG. 2. Crossbar 54 first engages finger 102 of reset member 64. This causes clockwise rotation of reset member 64 which in turn causes foot 100 to raise upwardly against web 88 of trip member 62.

The upward movement of foot 100 causes trip member 62 to pivot in a counterclockwise direction about axis 32 to the position shown in FIG. 4. The purpose of this upward tilting motion of trip member 62 is to permit pawl 74 to be cleared away from pawl receiving notch 96 so that catch member 60 will drop from the position shown in FIG. 7 to the position shown in FIG. 4.

After bar 54 has rotated reset member 64 as shown in FIG. 4, it clears reset finger 102 and permits the reset member 64 to again drop to its original position as shown in FIG. 5. At this point, bar 54 engages a bar receiving surface 104 on the rearward end of catch member 60. Continued downward movement of bar 54 causes a rotation of catch member 60 in a clockwise direction about axis 70 from the position shown in FIG. 5 to the position shown in FIG. 6. In FIG. 6, it should be noted that pawl 74 has risen above pawl receiving notch 96. After pawl 74 has risen to the position shown in FIG. 6, the operator releases the downward pressure he is exerting on cross bar 54 and the spring 38 causes cross bar 54 to be yieldably urged upwardly However, the rotation of catch member 60 to the position shown in FIGS. 6 and 7, causes catch pawl 80 to move above cross bar 54 so as to block the upward movement of cross bar 54. Trip pawl 74 is urged downwardly, but engages pawl receiving notch 96, thereby preventing any further counterclockwise rotation of catch member 60. Thus, all the parts are held in rigid fixed position shown in FIG. 7 with pawl receiving notch 96 preventing further counterclockwise rotation of catch member 60, and with catch pawl 80 preventing further upward movement of crossbar 54.

The entire mechanism can be released by downward pressure on the bait receiving tongue 94. This downward pressure is normally supplied by the animal which will be trapped. Downward pressure on bait receiving tongue 94 causes rotation of trip member 62 in a counterclockwise direction about axis 32. This causes notch 96 to swing out of retentive engagement with pawl 74, thereby permitting pawl 74 and catch member 60 to rotate in a counterclockwise direction from the position shown in FIG. 7 to the position shown in FIG. 5. This rotation of catch member 62 also causes pawl 80 to move out of retentive engagement or blocking engagement with cross bar 54, and the spring force from spring 38 causes cross bar 54 to swing upwardly from the position shown in FIG. 5 to the position shown in FIG. 4, thereby springing the trap and causing U-shaped member 36 to descend rapidly on the animal which tripped the bait tongue 94.

Thus, it can be seen that the device accomplishes at least all of its stated objectives. The trap can be set without placing one's hands or fingers in jeopardy of being hit by U-shaped member 36. It is merely necessary to grasp U-shaped member 34 and force it downwardly until it is retentively held by catch pawl 80. The only action which is necessary to set the trap is to swing cross bar 54 downwardly as far as it will go, and then release cross bar 54. Such action will result in setting of the trap.

Thus, the catch mechanism automatically sets when the cross bar 54 is moved to its set position. The catch mechanism is quite reliable, and the danger of an accidental release of the trap is minimized by the present catch mechanism. The trip mechanism of the present invention has been found to be highly sensitive, and is triggered by a very nominal downward pressure on bait receiving tongue 94.

Emptying of the present trap is also simple and clean inasmuch as it is merely necessary to grasp cross bar 54 and pivot jaw frame 14 in a clockwise direction so as to release the animal from the trap. It is not necessary to touch the animal or to touch the U-shaped frame 36 which has descended upon the animal.

The present invention also contains an automatic reset mechanism to always insure that catch member 60 is in the proper position for retentively engaging bar 54. In this regard, it should be noted that when catch member 60 is in the position shown in FIG. 7, it is not possible to move cross bar 54 downwardly from above catch pawl 80 to a position below catch pawl 80. Therefore, it is necessary to reset catch member 60 from the position shown in FIG. 7, to the position shown in FIG. 4 prior to the time that cross bar 54 descends to catch pawl 80. Reset member 64 insures that this resetting always takes place during the descension of cross bar 54 in the direction shown in FIG. 4. As cross bar 54 descends, it first engages reset finger 102 of reset member 64 so as to rotate reset member 64 and consequently rotate trip member 62 as shown in FIG. 4, thereby permitting catch member 60 to drop to the position shown in FIG. 4.

The device is very durable, and may be manufactured economically. Therefore, it can be seen that the device accomplishes at least all of its stated objectives.

What is claimed is:

1. An animal trap comprising:
a base having an upper surface, opposite sides, and opposite ends;
a jaw member pivotally mounted on said base for pivotal movement about a first horizontal axis from a cocked position to a sprung position, said jaw member having at least one horizontal bar extending transversely of said base and being movable in an arc during said pivotal movement of said jaw member,
spring means yieldably urging said jaw member to said sprung position;
a catch member pivotally mounted to said base for pivotal movement about a second horizontal axis, said catch member having a catch pawl thereon for retentively engaging said bar when said jaw member is in said cocked position,
said catch member being pivotal about said second horizontal axis from a catch position wherein said catch pawl retentively engages said bar in said cocked position to a release position wherein said catch pawl moves out of retentive engagement with said bar,
a trip member pivotally mounted on said base for pivotal movement about said first horizontal axis, said trip member having a catch receiving surface, said trip member being pivotal about said axis from a set position wherein said catch receiving surface engages said catch and holds said catch against movement from said catch position, said trip member being pivotal to a trip position wherein said catch receiving surface frees said catch member for movement to said release position, thereby freeing said jaw member for movement to said sprung position,
a reset member pivotally mounted to said base for pivotal movement about said second horizontal axis, said reset member including a foot at one end thereof and a reset cam, said reset cam being engageable with said bar during movement of said jaw member to said cocked position, said reset member being rotatable in response to said engagement between said bar and said reset cam so as to cause said foot to engage said trip member and move said trip member to said trip position whereby said catch member will fall by gravity to said release position.

2. An animal trap according to claim 1 wherein said jaw member comprises first and second U-shaped members each having a crossbar and a pair of opposite legs, one of said crossbars forming said one horizontal bar.

3. An animal trap according to claim 2 wherein said two U-shaped members are each disposed in a plane which is at an angle with respect to the other, said planes intersecting at the approximate location of said first horizontal axis.

4. An animal trap according to claim 1 wherein said second horizontal axis is located off-center with respect to the center of gravity of said catch member whereby gravity normally urges said catch member to said release position, said catch member having a bar receiving surface which is engageable by said bar during movement of said jaw member to said cocked position for causing rotation of said catch member from said release to said catch position.

5. An animal trap according to claim 4 wherein said catch member includes a cam surface positioned to cam against said trip member during movement of said catch member from said release position to said catch position, said trip member being responsive to said camming action of said cam surface to move first to said trip position and then to said set position.

6. An animal trap according to claim 5 wherein said cam surface is an arcuate surface formed above said pawl whereby said cam surface precedes said pawl during movement of said catch member from said release position to said catch position.

7. An animal trap according to claim 2 wherein one of said U-shaped members is in facing engagement with a front portion of said upper surface of said base whenever said jaw member is in said sprung position, said front portion of said upper surface being on one side of said first horizontal axis, said other of said U-shaped members being upstanding when said jaw member is in said sprung position.

8. An animal trap according to claim 7 wherein said one horizontal bar which engages said bar receiving surface of said catch member is the horizontal bar of said other U-shaped member.

9. An animal trap according to claim 8 wherein said bar receiving surface and said catch pawl are located on the side of said first horizontal axis opposite said front portion of said base upper surface.

* * * * *